US010019894B2

(12) United States Patent
Agardh et al.

(10) Patent No.: US 10,019,894 B2
(45) Date of Patent: Jul. 10, 2018

(54) REMOTE CONTROLLING A PLURALITY OF CONTROLLABLE DEVICES

(71) Applicant: SONY MOBILE COMMUNICATIONS INC., Tokyo (JP)

(72) Inventors: Kåre Agardh, Rysebäck (SE); Erik Bengtsson, Eslöv (SE); Ola Thörn, Limhamn (SE)

(73) Assignee: SONY MOBILE COMMUNICATIONS INC., Tokyo (JP)

(*) Notice: Subject to any disclaimer, the term of this patent is extended or adjusted under 35 U.S.C. 154(b) by 0 days.

(21) Appl. No.: 15/357,409

(22) Filed: Nov. 21, 2016

(65) Prior Publication Data

US 2017/0162036 A1 Jun. 8, 2017

(30) Foreign Application Priority Data

Dec. 3, 2015 (EP) .................................... 15197748

(51) Int. Cl.
*G08C 19/00* (2006.01)
*G08C 17/02* (2006.01)
(Continued)

(52) U.S. Cl.
CPC ......... *G08C 17/02* (2013.01); *G08C 2201/70* (2013.01); *G08C 2201/71* (2013.01); *G08C 2201/92* (2013.01)

(58) Field of Classification Search
CPC .... G08C 17/02; G08C 2201/70; G08C 19/12; G01S 5/14; G01S 5/12; A63F 13/12; G09G 5/00; H04L 17/02
(Continued)

(56) References Cited

U.S. PATENT DOCUMENTS

| | | | | |
|---|---|---|---|---|
| 5,726,645 A * | 3/1998 | Kamon | H04B 1/202 | |
| | | | 340/12.28 | |
| 6,909,891 B2 * | 6/2005 | Yamashita | H04M 1/72533 | |
| | | | 455/418 | |

(Continued)

FOREIGN PATENT DOCUMENTS

| | | |
|---|---|---|
| EP | 2 797 330 | 10/2014 |
| WO | 2005/031675 | 4/2005 |

(Continued)

OTHER PUBLICATIONS

European Search report dated Jun. 2, 2016 for corresponding European application No. 15197748.5.

*Primary Examiner* — Nam V Nguyen
(74) *Attorney, Agent, or Firm* — Renner Otto Boisselle and Sklar

(57) ABSTRACT

The present application relates to a remote control device for controlling a plurality of controllable devices. The remote control device comprises at least two spaced apart antennas for receiving a radio signal from a same positioning device, a sending unit for sending a control signal, and a control unit. The control unit is configured to determine a position information of the remote control device in relation to the positioning device based on the radio signal, to select a controllable device of the plurality of controllable devices depending on the position information, and to send a control information for controlling the selected controllable device via the control signal with the sending unit to the selected controllable device.

16 Claims, 2 Drawing Sheets

(51) Int. Cl.

| | |
|---|---|
| ***G01S 5/14*** | (2006.01) |
| ***G01S 5/12*** | (2006.01) |
| ***G09G 5/00*** | (2006.01) |
| ***G08C 19/12*** | (2006.01) |

(58) Field of Classification Search
USPC ............... 340/12.5; 342/458; 463/39, 36, 37
See application file for complete search history.

(56) References Cited

U.S. PATENT DOCUMENTS

| | | | | |
|---|---|---|---|---|
| 7,283,084 | B2 * | 10/2007 | Di Peppe | G08C 23/04 340/12.52 |
| 8,031,121 | B2 * | 10/2011 | Rofougaran | G01S 13/426 342/458 |
| 8,258,930 | B2 * | 9/2012 | Park | H05B 37/0272 340/13.24 |
| 8,682,169 | B2 * | 3/2014 | Hardaker | G08C 23/04 398/106 |
| 8,872,637 | B2 * | 10/2014 | Talstra | G08C 17/02 340/12.52 |
| 8,884,871 | B2 * | 11/2014 | Howard | G01S 5/12 345/156 |
| 9,355,557 | B2 * | 5/2016 | Hong | G08C 19/00 |
| 9,576,471 | B2 * | 2/2017 | Penisoara | G08C 17/02 |
| 9,674,563 | B2 * | 6/2017 | Wheatley | H04N 21/4532 |
| 2005/0073497 | A1 * | 4/2005 | Kim | G01S 19/14 345/158 |
| 2007/0043453 | A1 * | 2/2007 | Buil | G08C 19/28 700/65 |
| 2008/0108307 | A1 * | 5/2008 | Yeh | G01S 5/0252 455/41.2 |
| 2011/0210849 | A1 * | 9/2011 | Howard | G08B 13/1427 340/539.32 |
| 2012/0212374 | A1 * | 8/2012 | Kirby | G01S 5/021 342/451 |
| 2013/0113993 | A1 | 5/2013 | Dagitt, III | |
| 2015/0048976 | A1 * | 2/2015 | Petersen | H04B 5/0075 342/367 |
| 2015/0264506 | A1 | 9/2015 | Balabanis et al. | |
| 2016/0370450 | A1 * | 12/2016 | Thorn | G01S 3/46 |

FOREIGN PATENT DOCUMENTS

| | | |
|---|---|---|
| WO | 2010/112973 | 10/2010 |
| WO | 2014/177909 | 11/2014 |

* cited by examiner

REMOTE CONTROLLING A PLURALITY OF CONTROLLABLE DEVICES

FIELD OF THE INVENTION

The present invention relates to a remote control device for controlling a plurality of controllable devices. Furthermore, the present invention relates to a positioning device supporting the remote control device to control the plurality of controllable devices. Finally, the present invention relates to a system comprising a plurality of controllable devices which may be controlled by the remote control device, and to a method for controlling a plurality of controllable devices with the remote control device.

BACKGROUND OF THE INVENTION

Pointing is a straightforward kind of interaction of human beings. It is a common way for people to point to an item which they are interested in, which they want to talk about, and which they want to interact with. When interacting with objects that are not within direct reach, pointing is also beneficial since it allows to interact or talk about an item without walking straight to it. Commonly used devices to assist in pointing comprise for example sticks or laser pointers.

For controlling a controllable device, for example a TV screen, a hi-fi system or an illumination system, remote controls relying on infrared light communications may be used. For controlling such a controllable device, the user intuitively points to the controllable device and operates the remote control to control the functions of the controllable device. In view of the increasing number of controllable devices in for example a home environment, remote controllers are available which are capable of controlling a plurality of controllable devices. However, for controlling a specific function of a specific controllable device, the user has to operate a specific control element assigned to the specific controllable device. As an alternative, the operator may actuate a selector to indicate which specific controllable device is to be controlled before actuating a generic control element. A further problem with remote controls that rely on infrared light is that the signals may be blocked by objects in the line of sight between the remote controller and the controllable device to be controlled.

Therefore, there is a need in the art for a universal remote controller for controlling a plurality of controllable devices in an intuitive way with a simple user interface interaction.

SUMMARY OF THE INVENTION

According to the present invention, this object is achieved by the features of the independent claims. The dependent claims define embodiments of the invention.

According to the present invention, a remote control device for controlling a plurality of controllable devices is provided. The remote control device comprises at least two antennas for receiving a radio signal from a same positioning device. The at least two antennas are arranged spaced apart from each other. For example, the distance between two antennas of the at least two antennas is a few centimeters, for example in a range of 1 to 20 cm. For example, the radio signal sent from the positioning device is received simultaneously at the at least two antennas. However, due to the distance between the antennas, depending on an arrangement of the positioning device in relation to the at least two antennas, the radio signal may be received at the at least two antennas at different points of time or there may be a phase shift between the radio signals detected at each of the at least two antennas. The remote control device comprises furthermore a sending unit for sending a control signal, and a control unit. The sending unit may comprise for example an infrared sender, a Bluetooth interface or the wireless local area network interface.

The control unit is configured to determine the position of the remote control device in relation to the positioning device based on the radio signal received from the positioning device via the at least two antennas. For example, the control unit may determine the position information of the remote control device in relation to the positioning device based on the aforementioned phase shift between the radio signals received at the at least two antennas. Furthermore, a time of flight algorithm and a triangulation algorithm may be used to determine the position information of the remote control device in relation to the positioning device. In particular, the position information of the remote control device may comprise for example an angle of arrival of the radio signal and a distance relative to the at least two antennas. For example, depending on the arrangement of the at least two antennas in a housing of the remote control device, an orientation of a housing of the remote control device in relation to the positioning device, and/or a distance between the remote control device and the positioning device may be determined as the position information of the remote control device. For example, an angle of arrival of the radio signal may be determined by the control unit based on the reception of the radio signal at the at least two antennas. The orientation of the housing of the remote control device in relation to the positioning device may comprise an angle between a straight line from the remote control device to the positioning device and a longitudinal axis of the housing of the remote control device. The radio signal received from the positioning device may comprise for example a Bluetooth signal.

The control unit is furthermore configured to select a controllable device of the plurality of controllable devices depending on the position information of the remote control device. For example, in case the positioning device is located near or within a specific controllable device, when the housing of the remote control device is pointing at the specific controllable device, the above described angle may be rather small, nearly null or below a specific threshold. Thus, this small angle may indicate that the user of the remote control device is pointing at the specific controllable device and therefore the specific controllable device may be selected. As an alternative, in case the positioning device is located apart from the specific controllable device, which is intended to be controlled, the above described angle may have a specific value which is assigned to the specific controllable device and which may be predefined in the remote control device. Therefore, when the user is pointing with the remote control device to the specific controllable device, the remote control device is oriented in a specific direction to the positioning device. This information may be used to select the specific controllable device as that device the user wants to control.

Finally, the control unit is configured to send a control information for controlling the selected controllable device via the control signal with the sending unit to the selected controllable device.

With the above described remote control device an intuitive way of controlling a plurality of controllable devices is enabled. For controlling a controllable device, a user aims towards one of the plurality of controllable devices which is to be controlled. The remote control device detects its orientation to the controllable devices by receiving the radio signal as an orientation aid. Then, the remote control device may control the controllable device that has a closest match to the detected orientation.

According to an embodiment, the remote control device comprises a user interface for receiving a user input from a user of the remote control device. The control unit is configured to determine the control information for controlling the selected controllable device depending on the user input and the selected controllable device. In other words, depending on the selected controllable device and based on a user input, control information which matches the selected controllable device is determined and sent via the control signal to the controllable device.

For example, the user interface may comprise a plurality of control elements for receiving the user input. The control unit assigns to each of the plurality of control elements a corresponding control function for the selected controllable device. Each control function may be assigned a corresponding control information for controlling the control function at the controllable device. For example, the user interface may comprise a plurality of pushbuttons, and the plurality of controllable devices may comprise for example a TV and an illumination device. Depending on the selected controllable device one pushbutton may be assigned to a control function for increasing the volume of the TV or a control function for increasing the brightness of the illumination device. Consequently, depending on the orientation of the remote control device, upon actuating the one pushbutton, either control information for increasing the volume of the TV or a control information for increasing the brightness of the illumination device is sent to the corresponding controllable device. This enables an intuitive and comfortable remote controlling of a plurality of controllable devices arranged for example at home in a living room.

According to a further embodiment, the user interface comprises a display unit. The control unit is configured to display for each of the plurality of control elements the assigned corresponding control function on the display. For example, the display and the control elements may be realized as a touch screen such that the control elements are displayed together with their assigned control function on the display and may be actuated upon touching the display at the position where the control elements are displayed. Furthermore, the display may indicate which controllable device is actually selected. The design and appearance of the user interface may vary while the user is pointing to the controllable devices with the remote control device. This provides a direct feedback to the user concerning which controllable device is actually selected and which functions of the selected controllable device may be controlled.

According to another embodiment, the remote control device comprises furthermore a memory for storing location information of the plurality of controllable devices. The location information indicates for each controllable device a corresponding location of the controllable device in relation to a location of the positioning device. The control unit is configured to select a controllable device of the plurality of controllable devices depending on the position information of the remote control device and the location information of the plurality of controllable devices.

As described above, the remote control device may determine its position information in relation to the positioning device based on the radio signal received from the positioning device via the at least two antennas. In case the positioning device is integrated into a controllable device, this position information may be used to determine directly, if the remote control device is pointing to the corresponding controllable device, for example based on an angle of arrival of the radio signal. However, not every controllable device may be equipped with a corresponding positioning device, for example inexpensive, small or older devices. However, if at least one positioning device is arranged within a room where a plurality of controllable devices are arranged, the remote control device may determine its positioning information, in particular an angle of arrival of the radio signal and a relative distance to the positioning device, based on the radio signal from the available positioning device. In combination with the location information of the plurality of controllable devices, the remote control device may also determine if it is pointing to a controllable device which is arranged in a certain arrangement with respect to the positioning device. This enables the remote control device to determine that it is pointing to a controllable device which does not comprise a positioning device and which therefore does not send radio signals for supporting the remote control device to determine its position information and orientation. Therefore, also controllable devices which do not comprise a positioning device, for example so-called legacy devices, may be controlled intuitively by the remote control device.

The location information of the plurality of controllable devices may be configured by the user with a specific application and stored in the memory of the remote control device.

As an alternative, according to an embodiment, the location information of the plurality of controllable devices may be learned by the remote control device as follows. At least one positioning device should be present in a room where a plurality of controllable devices are arranged. For learning the location information of the plurality of controllable devices, the control unit is configured to operate in a training mode upon a request received via the user interface. In the training mode, while the user directs the remote control device into a direction to a specific controllable device, the control unit is configured to determine the position of the remote control device in relation to the positioning device based on the radio signal received from the positioning device via the at least two antennas. Additionally, the control unit receives from the user via the user interface an identifier relating to the controllable device at which the remote control device is currently directed. The control unit determines the location of the controllable device in relation to the location of the positioning device depending on the positioning information of the remote control device. For example, the control unit may determine an angle of reception of the radio signal from the positioning device while it is pointing to the controllable device identified by the user. The determined location of the controllable device is stored in the memory. Thus, a plurality of controllable devices, which do not emit radio signals as positioning information for the remote control device, may be stored in the memory along with the location information. The controllable devices may be controlled by the remote control device in the future.

In another embodiment, the user interface comprises an audio input unit for receiving an audio information in an environment of the remote control device. The audio input unit may comprise for example a microphone of the remote control device. The control unit is configured to determine the control information for controlling the selected controllable device depending on the audio information and the selected controllable device. For example, when the remote control device is pointing to a specific controllable device, the user may just say "turn it on" and a corresponding control information for turning on the controllable device at which the remote control device is pointing is sent to the controllable device.

According to another embodiment, the radio signal comprises an identifier for identifying the positioning device. The control information for controlling the controllable device is determined depending on the identifier. For example, some or even all of the controllable devices may comprise a corresponding positioning device. Thus, each controllable device is capable of emitting a radio signal which may be used by the remote control device to determine its position information. By adding an identifier to the radio signal, the remote control device may easily determine to which controllable device it is currently pointing, for example based on an angle of arrival of the radio signal. The identifier may comprise additional information, for example the control information or a scheme of the control information required for controlling corresponding control functions of the controllable device. This enables the remote control device to control controllable devices without any preceding configuration of the remote control device.

According to yet another embodiment, the remote control device comprises furthermore a visual detection unit for detecting a visual information in an environment of the remote control device. For example, the visual detection unit may comprise a camera in the remote control device. Depending on the visual information detected by the visual detection unit, the control unit is configured to determine a direction information indicated by the user in the environment of the remote control device. For example, the visual detection unit may detect that the user is pointing with a finger to a controllable device or is making a hand gesture or is looking at a controllable device. Depending on the direction information determined from the visual information, the control unit selects a controllable device from the plurality of controllable devices to be controlled. For example, while the user is looking into a direction of a controllable device, for example a television set, the user may input commands for controlling the television set via control elements of the user interface of the remote control device or via the above described audio input unit. Thus, the user does not need to hold the remote control device while controlling the remote controllable devices.

The remote control device may be a dedicated device specifically designed for controlling a plurality of remote controllable devices. However, the remote control device may be integrated into mobile devices having additional functionalities, for example into a mobile telephone, in particular a mobile smart phone, a mobile gaming device, a tablet computer, a smart wearable device or a smart mobile accessory. A smart mobile accessory or a smart wearable device may comprise a wearable computer, also known as body-borne computer or simply wearable, which is a miniature electronic device that may be worn by a user under, with or on top of clothing. Furthermore, the remote control device may be integrated into a headset such that a controllable device may be addressed and controlled by a user wearing the headset and looking into the direction of the controllable device.

Furthermore, according to the present invention, a positioning device is provided. The positioning device comprises a sending unit for sending a radio signal configured to be received by a remote control device for determining a position information of the remote control device in relation to the positioning device based on the radio signal. The positioning device may be a stand-alone device or may be comprised for example in a home entertainment system, an audio system, a television set, a light control system, climate control system, heating system or a wireless local area network access point. Furthermore, the positioning device may be comprised for example in an intelligent alarm clock, headphones, security detectors, fire detectors, stereo equipment, Dolby surround equipment, and devices which may be connected to and configured via the Internet, so-called Internet of Things (IoT) objects.

The positioning device may be used in combination with the above-described remote control device for controlling a plurality of remote controllable devices.

According to an embodiment, the radio signal emitted by the sending unit comprises an identifier for identifying the equipment in which the positioning device is comprised.

According to the present invention, additionally a system is provided which comprises a plurality of controllable devices, a positioning device as defined above and the remote control device as defined above. The system enables to control the plurality of controllable devices with the single remote control device in an intuitive way by just pointing with the remote control device to the controllable device which is intended to be controlled. Thus, a control comfort may be increased and a number of required remote control devices may be reduced.

According to the present invention, furthermore a method for controlling a plurality of controllable devices with a remote control device is provided. According to the method, a radio signal is received from a same positioning device at at least two spaced apart antennas of the remote control device. The position information of the remote control device in relation to the positioning device is determined based on the radio signal received from the positioning device at the at least two antennas. A controllable device of the plurality of controllable devices is selected depending on the positioning information of the remote control device. A control information for controlling the selected controllable device is sent from the remote control device to the selected controllable device.

The above-described method may be executed by the above-described remote control device and comprises therefore also the above-described advantages.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
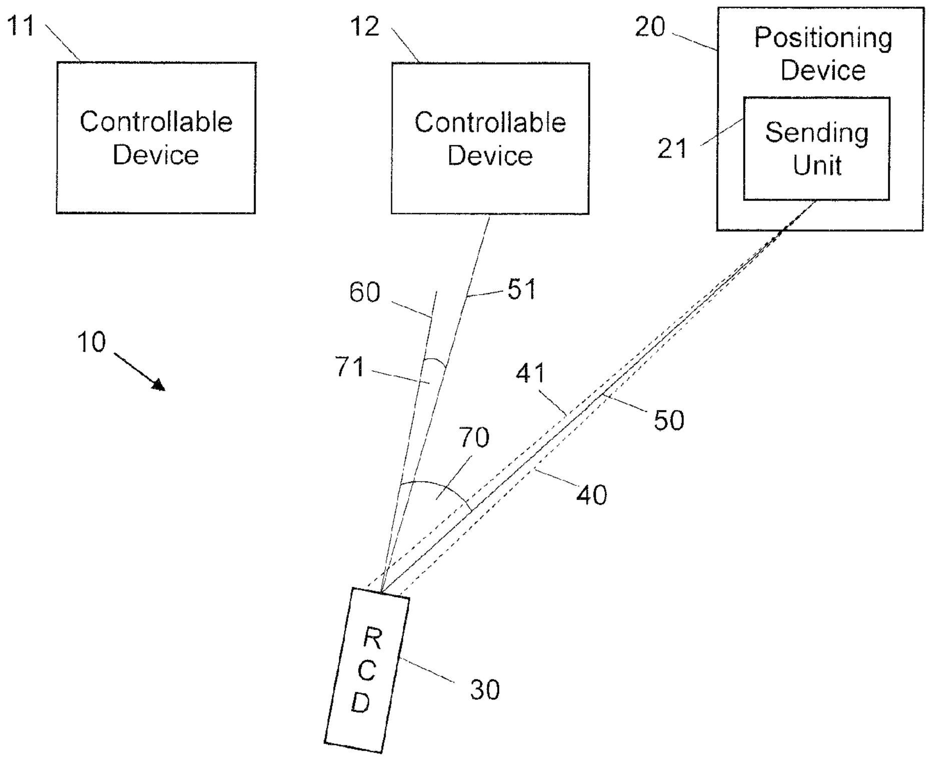
FIG. 1 shows schematically a system according to an embodiment of the present invention comprising a plurality of controllable devices and a remote control device.

FIG. 1 shows a system 10 comprising controllable devices 11 and 12, a positioning device 20, and a remote control device (RCD) 30. The system 10 may be arranged for example in a user's home, for example in a living room, and the controllable device 11 may represent a light control system and the controllable device 12 may represent a television set.

The positioning device 20 comprises a sending unit 21 for sending a radio signal 40, 41 configured to be received by the remote control device 30 for determining a position information of the remote control device 30 in relation to the positioning device 20 based on the radio signal. As will be described later in more detail in connection with FIG. 3, the remote control device 30 comprises at least two antennas 34, 35. As will be described in the following, an angle of arrival of the radio signal from the sending unit 21 will be determined. Therefore, at least two antennas are necessary (two-dimensional angle of arrival). However, the remote control device 30 may comprise more than two antennas, for example at least three antennas for detecting a three-dimensional angle of arrival, or even more than three antennas for increasing detection accuracy. However, for reasons of clarity, in the following, only two antennas will be discussed. Operation of three or more antennas is assumed to be accordingly.

The antennas of the remote control device 30 are arranged spaced apart from each other. Therefore, the radio signal from the sending unit 21 will be received via two paths 40 and 41 at the two antennas. The radio signal will be received via path 40 at one of the two antennas of the remote control device 30, and the same radio signal will be received via path 41 at the other antenna of the two antennas of the remote control device 30. Therefore, for example based on a time of flight measurement or a phase difference between the radio signal received along the paths 40, 41, an angle of arrival may be determined. For example, the remote control device 30 may have a longitudinal axis 60 which is perpendicular to a plane of reception in which the two antennas are arranged. Thus, an angle 70 of arrival may be determined by the remote control device 30 between the longitudinal axis 60 and a direction 50 from the remote control device 30 to the positioning device 20. Thus, an orientation of the remote control device 30 within the system 10 may be determined. Furthermore, based on the received radio signal, a relative distance between the positioning device 20 and the antennas 34, 35 may be determined. For this, for example a time of flight or a signal strength of the radio signal may be determined or a change of the angle of arrival may be determined while the remote control device 30 is moved. The movement of the remote control device 30 may be determined with sensors of the remote control device 30, for example an accelerometer. Furthermore, in case at least two positioning devices 20 are present in system 10, a relative distance with respect to the positioning devices 20 may be determined by determining the angles of arrival to each of the positioning devices and triangulation. Thus, a position and orientation of the remote control device 30 within the system 10 may be determined.

In addition, the arrangement of the controllable devices 11, 12 and of the positioning device 20 may be known to the remote control device 30, for example stored in a memory of the remote control device 30. Based on the determined position and orientation of the remote control device 30 in relation to the positioning device 20 within the system 10, the remote control device 30 knows from the angle 70 that it is not pointing to the positioning device 20. Taking into account the positioning information concerning the controllable devices 11, 12, the remote control device 30 may determine angle 71 between the longitudinal axis of the remote control device 30 and a direction 51 from the remote control device 30 to the controllable device 12. When the remote control device 30 determines that angle 71 is very small, nearly null or below a predefined threshold, the remote control device 30 may determine that it is actually pointing to the controllable device 12. This may be used by the remote control device 30 to configure control elements such that functions of the controllable device 12 may be controlled. Upon activation of the control elements by the user, corresponding control signals may be sent by the remote control device 30 to the controllable device 12. The control signals for controlling the controllable device 12 from the remote control device 30 to the controllable device 12 may comprise for example infrared signals, a Bluetooth radio communication, a wireless local area network communication or a wired local area network communication.

When the remote control device 30 in the exemplary system 10 of FIG. 1 is rotated such that the longitudinal axis 60 is pointing approximately to the controllable device 11, corresponding functions of the controllable device 11 may be controlled via the remote control device 30 by reconfiguring its control elements correspondingly.

The location information of the devices 11 and 12 may be configured in the remote control device 13 during a training session. For accomplishing this, the remote control device 13 may be operated upon a request from the user in a training mode. In the training mode, the user may point with the remote control device 30 into a direction of one of the controllable devices 11 or 12 and enters an information into the remote control device indicating that the remote control device 30 is now pointing to a specific controllable device. The remote control device 30 determines its actual orientation based on the radio signal received from the positioning device 20. Based on the actual orientation, the direction into which the specific controllable device is arranged may be determined, and this information may be stored in the remote control device 30 as location information for the identified controllable device. Such a training sequence may be repeated for each controllable device which is to be controlled by the remote control device 30.

Figure 2:
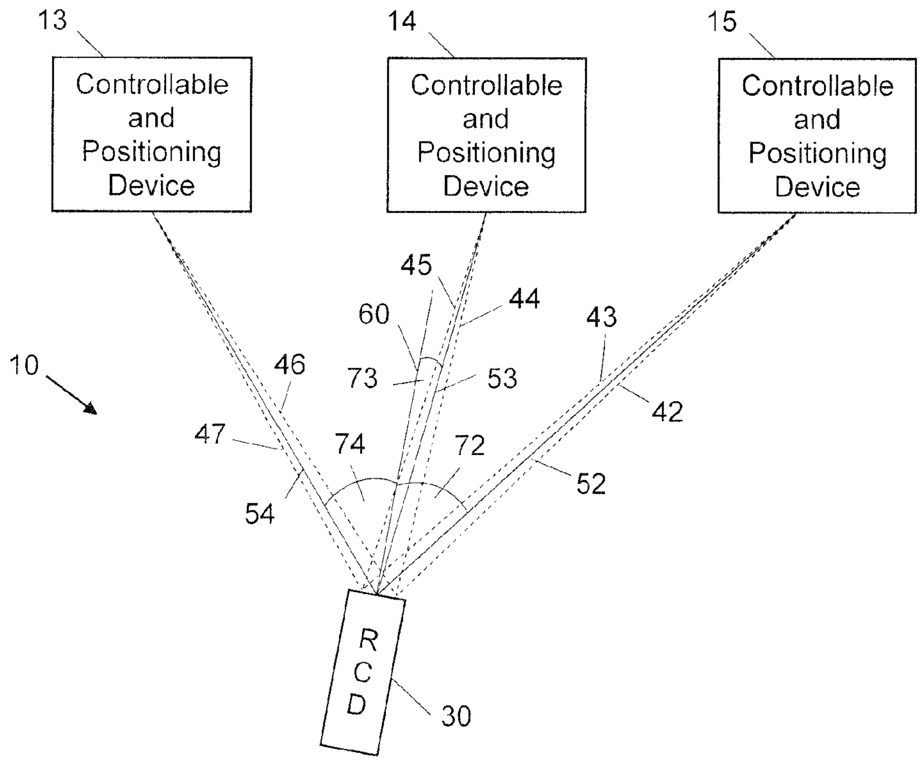
FIG. 2 shows schematically a system according to a further embodiment of the present invention comprising a plurality of controllable devices and a remote control device.

FIG. 2 shows another exemplary system 10 comprising three controllable devices 13, 14 and 15 and a remote control device (RCD) 30. Each of the controllable devices 13 to 15 comprises additionally a positioning device comparable to the positioning device 20 of FIG. 1. Therefore, the controllable devices 13 to 15 are named in FIG. 1 controllable and positioning device, and each controllable device 13 to 15 comprises a corresponding sending unit 21 which is not shown in FIG. 2. However, each controllable device 13 to 15 sends a radio signal configured to be received by the remote control device 30 for determining the position of the remote control device 30 in relation to the corresponding controllable device 13 to 15.

As described above in connection with FIG. 1, an angle of arrival of each of the radio signals from each of the controllable devices 13 to 15 may be determined by the remote control device 30. In detail, the radio signal emitted from the controllable device 15 is received via paths 42 and 43 at the two antennas of the remote control device 30 and a corresponding direction 52 from the remote control device 30 to the controllable device 15 may be determined. Furthermore, an angle 72 of arrival between the longitudinal axis 60 of the remote control device 30 and the direction 52 to the controllable device 15 may be determined. In the same way, the radio signal emitted from the controllable device 14 is received via paths 44 and 45 at the two antennas of the remote control device 30 and a corresponding direction 53 from the remote control device 30 to the controllable device 14 may be determined. An angle 73 of arrival between the longitudinal axis 60 of the remote control device 30 and the direction 53 to the controllable device 14 may be determined. Likewise, the radio signal emitted from the controllable device 13 is received via paths 46 and 47 at the two antennas of the remote control device 30 and a corresponding direction 54 from the remote control device 30 to the controllable device 13 may be determined. An angle 74 of arrival between the longitudinal axis 60 of the remote control device 30 and the direction 54 to the controllable device 13 may be determined.

Based on the determined angles 72 to 74 the remote control device 30 may determine into which direction it is currently pointing. In the example shown in FIG. 2, the remote control device 30 is pointing to the controllable device 13 as angle 73 is the smallest of angles 72 to 74. The radio signals received from the controllable devices 13 to 15 may each comprise a corresponding identifier identifying the corresponding controllable device 13 to 15. Thus, based on the identifier and the direction into which the remote control device 30 is pointing, the remote control device 30 may configure its user interface and control elements for controlling the controllable device 14 and may send corresponding control information upon the user activating the user interface and the control elements.

Figure 3:
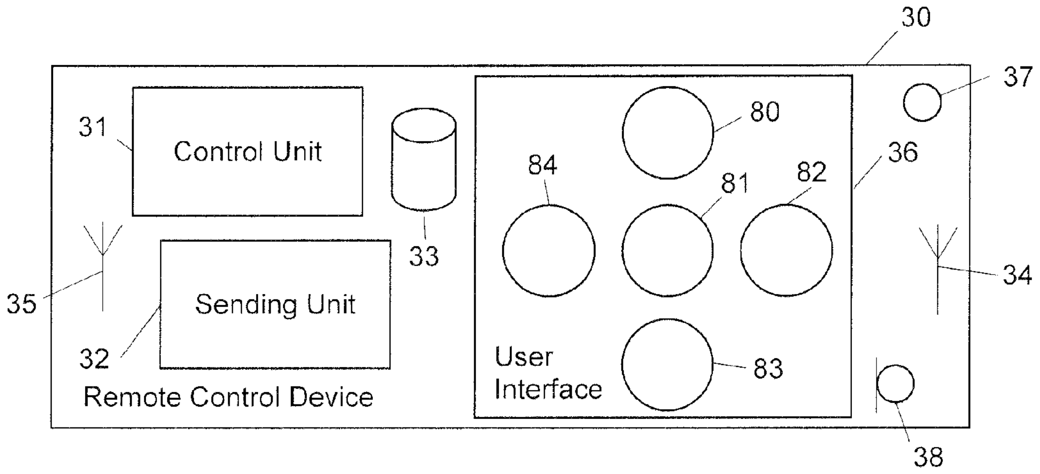
FIG. 3 shows schematically a remote control device according to an embodiment of the present invention.

FIG. 3 shows the remote control device 30 in more detail. The remote control device 30 comprises a control unit 31, a sending unit 32, a memory 33, a first antenna 34, a second antenna 35, a user interface 36, a camera 37, and a microphone 38. The first antenna 34 and the second antenna 35 are arranged spaced apart in a housing of the remote control device 30. The distance between the first antenna 34 and the second antenna 35 may be a few centimeters, for example in a range of 1 to 20 cm. For example, the antennas 34, 35 may be arranged at the top and bottom sides of the remote control device 30.

Figure 4:
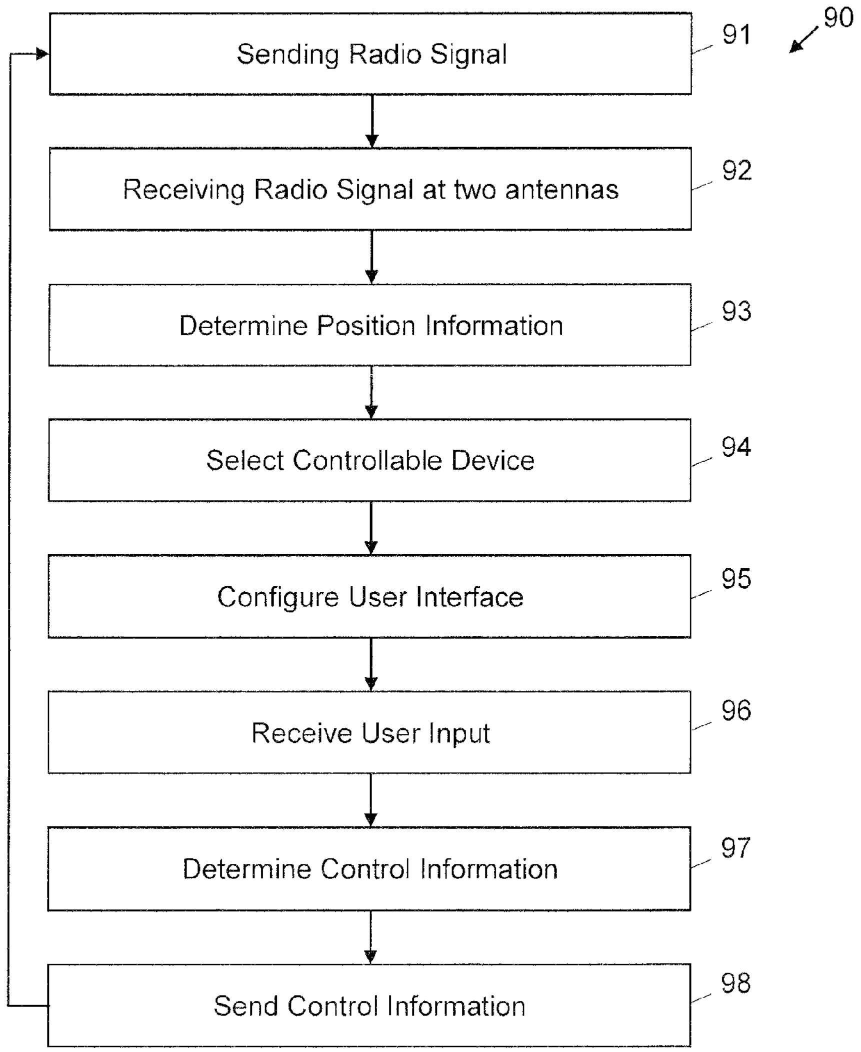
FIG. 4 shows method steps of a method for controlling a plurality of controllable devices with a remote control device according to an embodiment of the present invention.

Operation of the remote control device 30 will be described in more detail with reference to a method 90 shown in FIG. 4. Method 90 comprises method steps 91 to 98. In step 98 a radio signal is sent from a positioning device. As described above in connection with FIGS. 1 and 2, in step 92 the same radio signal from the same positioning device is received at the first and the second antenna 34 and 35. In step 93, the control unit 31 determines a position information of the remote control device 30 in relation to the positioning device from which the radio signal was received based on a two-way reception of the radio signal. Furthermore, in step 94, the control unit selects a controllable device of the plurality of controllable devices depending on the position information. As described above, location information of the plurality of controllable devices may be stored in the memory 33 and may be used for selecting one of the controllable devices.

The controllable device, which is intended by the user to be controlled, may additionally be determined by a detection of non-physical interactions with the user. For example, the remote control device 30 may monitor its environment with the camera 37. When a user in the environment points into a direction of a controllable device, for example by a hand gesture or an eye movement or directing the head into the direction of the controllable device, this visual information may be determined and a corresponding direction information derived therefrom. Based on the position information of the remote control device and this visual information, the remote control device determines the controllable device which is to be controlled. As an alternative, the camera may be arranged somewhere in the room, for example at the ceiling of the room or in one of the controllable devices, and the visual information detected by the camera may be transmitted to the remote control device via for example Bluetooth or a wireless local area network. Based on the visual information the remote control device may determine a gesture of the user or where the user is looking at and how the user is oriented with respect to the remote control device. Based on this visual information and the position information of the remote control device, the remote control device may select a user intended controllable device for a subsequent control.

Based on the selected controllable device, the control unit 31 configures in step 95 the user interface 36 such that it represents control functions for controlling the selected controllable device. In step 96, a user input via the user interface 36 is received, for example by activating one of the represented control functions. In step 97 a control information corresponding to the actuated control function is determined and sent via the sending unit 32 to the selected controllable device in step 98.

As an alternative, user commands for controlling the selected controllable device may be received via the microphone 38. For example, while the remote control device is directed to a lamp, the user may just say “turn it on” to turn on the light or “turn it off” to turn off the light. In particular in combination with the above described visual information, the user may control for example the controllable device, for example a television set, by looking or pointing at the television set and say a corresponding command like “volume up”, “volume down”, “channel up”, “channel down” and so on.

Although, in the description above, the remote control device 30 comprises two antennas 34, 35 for receiving the radio signal from the same positioning device for determining the position information of the remote control device 30, the remote control device 30 may comprise more than two antennas. For example, the remote control device 30 may comprise three antennas. The radio signal is received from the same positioning device via the three antennas. A three-dimensional direction into which the positioning device is arranged may be determined based on the radio signal received via the three antennas.

The user interface 36 may comprise a plurality of control elements. For example, as shown in FIG. 3, the user interface 36 may comprise five pushbuttons 80 to 84. Based on the selected controllable device, a control function of each of the pushbuttons 80 to 84 may be varied. Accordingly, control information related to the control functions may be varied.

For example, pushbutton 82 may represent a function to tune up the volume in connection with a TV or a music player, and a function to increase a light intensity in connection with an illumination system. Pushbutton 84 may represent a function to tune down the volume in connection with the TV or the music player, and a function to lower the light intensity in connection with the illumination system. Furthermore, pushbuttons 80 and 83 may represent functions to tune up and down a channel of the TV, to skip to the next and previous song of the music player, and to change the color of the light of the illumination system. For example, in any case, pushbutton 81 may represent a function to switch on and off the selected controllable device.

In an alternative implementation, the user interface 36 may comprise a so-called touch screen on which the control elements are displayed and which is capable to detect a user touching each of the displayed control elements. After the control unit has selected one of the controllable devices, a corresponding user interface may be displayed on the touch screen such that the current assignment of functions is visible as an aid to the user.

The remote control device 30 may be a stand-alone device or may be integrated into a consumer product, for example a mobile telephone, a mobile gaming device, a tablet computer or wearable device or a mobile accessory. In particular, the remote control device may be realized with low additional cost in connection with a mobile telephone or a tablet computer, as these devices provide already the required control unit, sending unit, user interface and an antenna. Furthermore, the positioning device 20 may be integrated into a consumer product like a TV set, a stereo system, detectors for security, and fire detectors.

The invention claimed is:

1. A remote control device for controlling a plurality of controllable devices, comprising:

at least two spaced apart antennas for receiving a radio signal from a same positioning device, a sending unit for sending a control signal, a user interface for receiving a user input from a user of the remote control device, a memory for storing location information of the plurality of controllable devices, the location information indicating for each controllable device a corresponding location of the controllable device in relation to a location of the positioning device, and a control unit configured to determine a position information of the remote control device in relation to the positioning device based on the radio signal received from the positioning device via the at least two antennas, to select a controllable device of the plurality of controllable devices depending on the position information of the remote control device, and to send a control information for controlling the selected controllable device via the control signal with the sending unit to the selected controllable device, to determine the control information for controlling the selected controllable device depending on the user input and the selected controllable device, to select the controllable device of the plurality of controllable devices depending on the position information of the remote control device and the location information of the plurality of controllable devices, wherein the control unit is configured to operate in a training mode upon a request received via the user interface, wherein, in the training mode, the control unit is configured to determine a position information of the remote control device in relation to the positioning device based on the radio signal received from the positioning device via the at least two antennas, to receive, from the user via the user interface, an identifier relating to a controllable device of the plurality of controllable devices, to determine a location of the controllable device in relation to the location of the positioning device depending on the position information of the remote control device, and to store the determined location of the controllable device in the memory.

2. The remote control device according to claim 1, wherein the user interface comprises a plurality of control elements for receiving the user input, wherein the control unit is configured to assign to each of the plurality of control elements a corresponding control function for the selected controllable device.

3. The remote control device according to claim 2, wherein the user interface comprises a display unit, wherein the control unit is configured to display for each of the plurality of control elements the assigned corresponding control function on the display.

4. The remote control device according to claim 1, wherein the radio signal comprises an identifier for identifying the positioning device, wherein the control information for controlling the selected controllable device is determined depending on the identifier.

5. The remote control device according to claim 1, wherein the position information of the remote control device comprises at least one of:

an angle of arrival of the radio signal at the at least two antennas, a relative distance between the positioning device and the at least two antennas, an orientation of a housing of the remote control device in relation to the positioning device, and a distance between the remote control device and the positioning device.

6. The remote control device according to claim 1, further comprising a visual detection unit for detecting a visual information, preferably a gesture of a user of the remote control device, in an environment of the remote control device, wherein the control unit is configured to determine direction information indicated by a user in the environment of the remote control device depending on the visual information detected by the visual detection unit, to select the controllable device of the plurality of controllable devices depending on the direction information.

7. The remote control device according to claim 1, wherein the remote control device comprises at least one of a group consisting of:

a mobile telephone, a headset, a mobile gaming device, a tablet computer, a wearable device, and a mobile accessory.

8. A remote control device for controlling a plurality of controllable devices, comprising:

at least two spaced apart antennas for receiving a radio signal from a same positioning device, a sending unit for sending a control signal, a user interface for receiving a user input from a user of the remote control device, and a control unit configured to determine a position information of the remote control device in relation to the positioning device based on the radio signal received from the positioning device via the at least two antennas, to select a controllable device of the plurality of controllable devices depending on the position information of the remote control device, to send a control information for controlling the selected controllable device via the control signal with the sending unit to the selected controllable device, and to determine the control information for controlling the selected controllable device depending on the user input and the selected controllable device, wherein the user interface comprises an audio input unit for receiving an audio information in an environment of the remote control device, wherein the control unit is configured to determine the control information for controlling the selected controllable device depending on the audio information and the selected controllable device.

9. The remote control device according to claim 8, wherein the remote control device comprises furthermore:

a memory for storing location information of the plurality of controllable devices, the location information indicating for each controllable device a corresponding location of the controllable device in relation to a location of the positioning device, wherein the control unit is configured to select the controllable device of the plurality of controllable devices depending on the position information of the remote control device and the location information of the plurality of controllable devices.

10. The remote control device according to claim 8, wherein the user interface comprises a plurality of control elements for receiving the user input, wherein the control unit is configured to assign to each of the plurality of control elements a corresponding control function for the selected controllable device.

11. The remote control device according to claim 10, wherein the user interface comprises a display unit, wherein the control unit is configured to display for each of the plurality of control elements the assigned corresponding control function on the display.

12. A system comprising:

a plurality of controllable devices, the remote control device according to claim 1, and a sending unit for sending a radio signal configured to be received by a remote control device for determining a position information of the remote control device in relation to the positioning device based on the radio signal, wherein the positioning device is comprised in at least one equipment of a group consisting of:

a stand-alone device, a home entertainment system, an audio system, a television set, a light control system, a climate control system, a heating system, and a wireless local area network access point.

13. A method for controlling a plurality of controllable devices with a remote control device, comprising:

receiving a radio signal from a same positioning device at at least two spaced apart antennas of the remote control device, determining a position information of the remote control device in relation to the positioning device based on the radio signal received from the positioning device at the at least two antennas, selecting a controllable device of the plurality of controllable devices depending on the position information of the remote control device, sending a control information for controlling the selected controllable device from the remote control device to the selected controllable device, determining the control information for controlling the selected controllable device depending on and the selected controllable device and a user interface for receiving a user input from a user of the remote control device, storing location information of the plurality of controllable devices, the location information indicating for each controllable device a corresponding location of the controllable device in relation to a location of the positioning device, and selecting the controllable device of the plurality of controllable devices depending on the position information of the remote control device and the location information of the plurality of controllable devices, operating in a training mode upon a request received via the user interface, wherein, in the training mode, determining a position information of the remote control device in relation to the positioning device based on the radio signal received from the positioning device via the at least two antennas, receiving, from the user via the user interface, an identifier relating to a controllable device of the plurality of controllable devices, determining a location of the controllable device in relation to the location of the positioning device depending on the position information of the remote control device, and storing the determined location of the controllable device.

14. The method according to claim 13, wherein the method is executed by a remote control device, comprising:

at least two spaced apart antennas for receiving a radio signal from a same positioning device, a sending unit for sending a control signal, and a control unit configured to determine a position information of the remote control device in relation to the positioning device based on the radio signal received from the positioning device via the at least two antennas, to select a controllable device of the plurality of controllable devices depending on the position information of the remote control device, and to send a control information for controlling the selected controllable device via the control signal with the sending unit to the selected controllable device.

15. A method for controlling a plurality of controllable devices with a remote control device, comprising:

receiving a radio signal from a same positioning device at at least two spaced apart antennas of the remote control device, determining a position information of the remote control device in relation to the positioning device based on the radio signal received from the positioning device at the at least two antennas, selecting a controllable device of the plurality of controllable devices depending on the position information of the remote control device, sending a control information for controlling the selected controllable device from the remote control device to the selected controllable device, determining the control information for controlling the selected controllable device depending on and the selected controllable device and a user interface for receiving a user input from a user of the remote control device, wherein the user interface comprises an audio input unit for receiving an audio information in an environment of the remote control device, and determining the control information for controlling the selected controllable device depending on the audio information and the selected controllable device.

16. A system comprising:

a plurality of controllable devices, the remote control device according to claim 8, and a sending unit for sending a radio signal configured to be received by a remote control device for determining a position information of the remote control device in relation to the positioning device based on the radio signal, wherein the positioning device is comprised in at least one equipment of a group consisting of:

a stand-alone device, a home entertainment system, an audio system, a television set, a light control system, a climate control system, a heating system, and a wireless local area network access point.

* * * * *